(12) United States Patent
Hioda (10) Patent No.: US 11,292,417 B2
(45) Date of Patent: Apr. 5, 2022

(54) KNEE AIRBAG DEVICE

(71) Applicant: Toyota Jidosha Kabushiki Kaisha, Toyota (JP)

(72) Inventor: Seiji Hioda, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 87 days.

(21) Appl. No.: 16/674,470

(22) Filed: Nov. 5, 2019

(65) Prior Publication Data
US 2020/0148153 A1  May 14, 2020

(30) Foreign Application Priority Data

Nov. 13, 2018  (JP) .............................. JP2018-213297

(51) Int. Cl.
| | | |
|---|---|---|
| *B60R 21/206* | (2011.01) | |
| *B60R 21/231* | (2011.01) | |
| *B60R 21/215* | (2011.01) | |
| *B60R 21/217* | (2011.01) | |
| *B60R 21/00* | (2006.01) | |

(52) U.S. Cl.
CPC .......... *B60R 21/206* (2013.01); *B60R 21/215* (2013.01); *B60R 21/217* (2013.01); *B60R 21/231* (2013.01); *B60R 2021/0051* (2013.01); *B60R 2021/0053* (2013.01); *B60R 2021/21537* (2013.01); *B60R 2021/23169* (2013.01)

(58) Field of Classification Search
CPC ... B60R 21/206; B60R 21/231; B60R 21/215; B60R 21/2171; B60R 21/205; B60R 21/201; B60R 21/217; B60R 2021/0051; B60R 2021/23169; B60R 2021/21537; B60R 2021/0053
USPC .............................................. 280/730.1, 732
See application file for complete search history.

(56) References Cited

U.S. PATENT DOCUMENTS

| | | | |
|---|---|---|---|
| 8,944,460 B2 * | 2/2015 | Mazzocchi | B60R 21/215 |
| | | | 280/728.3 |
| 2009/0152839 A1 * | 6/2009 | Thomas | B60R 21/215 |
| | | | 280/728.2 |
| 2011/0193328 A1 * | 8/2011 | Fukawatase | B60R 21/201 |
| | | | 280/730.2 |
| 2013/0113190 A1 | 5/2013 | Schneider et al. | |

(Continued)

FOREIGN PATENT DOCUMENTS

| | | |
|---|---|---|
| JP | 2014-532587 A | 12/2014 |
| JP | 2016-117386 A | 6/2016 |
| JP | 2017-202769 A | 11/2017 |

*Primary Examiner* — Keith J Frisby
(74) *Attorney, Agent, or Firm* — Dinsmore & Shohl LLP (57) ABSTRACT

A knee airbag device includes: a knee airbag that is housed in a folded state at a lower end portion of an instrument panel, and that, due to gas being supplied thereto, is inflated and expanded along the instrument panel; an airbag case that houses the knee airbag; an airbag door portion that structures a lower surface of the airbag case, and that, due to a planned rupture portion rupturing due to inflation pressure of the knee airbag, is opened toward a vehicle front side; and a flap that is housed within the airbag case, one end portion of the flap being fixed to the airbag case, another end portion of the flap being a free end, and that, at a time of inflation and expansion of the knee airbag, unfolds, and covers the airbag door portion from a vehicle rear side.

7 Claims, 4 Drawing Sheets

(56) References Cited

U.S. PATENT DOCUMENTS

2016/0288758 A1* 10/2016 Ando .................... B60R 21/231
2017/0327071 A1    11/2017 Maeda et al.

\* cited by examiner

KNEE AIRBAG DEVICE

CROSS-REFERENCE TO RELATED APPLICATION

This application claims priority under 35 USC 119 from Japanese Patent Application No. 2018-213297 filed on Nov. 13, 2018, the disclosure of which is incorporated by reference herein.

BACKGROUND

Technical Field

The present disclosure relates to a knee airbag device.

Related Art

Japanese Patent Application Laid-Open (JP-A) No. 2017-202769 discloses a knee airbag device having a bag body (a knee airbag) that is disposed beneath a housing box (an instrument panel), and that is inflated and expanded in the direction of a front seat at the time of a collision of the vehicle. In this JP-A No. 2017-202769, a guiding cloth, which covers the gap between an airbag case and the lower end of the housing box at the time of inflation and expansion the bag body, is provided. Structures in which a knee airbag device is provided at the lower portion of an instrument panel in the same way as in above-described JP-A No. 2017-202769 are disclosed also in JP-A No. 2014-532587 and JP-A No. 2016-117386.

However, in the techniques disclosed in the aforementioned three related art documents, there is the possibility that, at the time when the knee airbag inflates and expands, a portion of the airbag case such as the airbag door or the like will break and fly-off toward the vehicle occupant. As a countermeasure thereto, there is a method of forming the airbag case of a resin material such as an olefin-based thermoplastic elastomer (TPO), which is difficult to break even at low temperatures, or the like, but the manufacturing cost thereof is high.

SUMMARY

The present disclosure provides a knee airbag device at which a portion of an airbag case flying-off toward a vehicle occupant at the time of inflation and expansion is suppressed while the manufacturing cost thereof is kept down.

A first aspect of the present disclosure is a knee airbag device including: a knee airbag that is housed in a folded state at a lower end portion of an instrument panel, and that, due to gas being supplied thereto, is inflated and expanded along the instrument panel toward a vehicle rear side and a vehicle upper side; an airbag case that houses the knee airbag; an airbag door portion that structures a lower surface of the airbag case, and that, due to a planned rupture portion that is formed at a vehicle rear side end portion of the airbag door portion rupturing due to inflation pressure of the knee airbag, is opened toward a vehicle front side around a hinge portion that is provided at a vehicle front side end portion of the airbag door portion; and a flap that is housed within the airbag case, one end portion of the flap being fixed to the airbag case, another end portion of the flap being a free end, and that, at a time of inflation and expansion of the knee airbag, unfolds, and covers the airbag door portion from a vehicle rear side.

In the knee airbag device of the first aspect, the knee airbag is housed, in a folded state, at the lower end portion of the instrument panel. Due to gas being supplied thereto, the knee airbag is inflated and expanded toward the vehicle rear side and the vehicle upper side along the instrument panel. In this way, the knee portions of the vehicle occupant may be protected by the knee airbag that has inflated and expanded.

Further, the knee airbag is housed in the airbag case, and the lower surface of the airbag case is structured by the airbag door portion. Due to the planned rupture portion being ruptured by the inflation pressure of the knee airbag, the airbag door portion is opened toward the vehicle front side around the hinge portion. Due thereto, as compared with a structure in which the airbag door portion is opened toward the vehicle rear side (the vehicle occupant side), the airbag door portion flying-off toward the vehicle occupant may be suppressed.

Moreover, the flap is housed in the airbag case. One end portion of the flap is fixed to the airbag case, and the another end portion of the flap is a free end. At the time when the knee airbag inflates and expands, the flap unfolds and covers the airbag door portion from the vehicle rear side. Due thereto, even in a case in which a portion of the airbag case, such as the airbag door portion or the like, comes apart from the main body, the portion of the airbag case flying-off toward the vehicle occupant may be suppressed.

In a second aspect of the present disclosure, in the first aspect, the flap may be longer than the airbag door portion, and may be housed so as to cover a vehicle lower side surface and a vehicle rear side surface of the knee airbag, when the knee airbag is in the folded state.

In the knee airbag device of the second aspect, because the flap is longer than the airbag door portion, the distal end of the airbag door portion may be covered reliably. Further, the flap is housed so as to cover the vehicle lower side surface and the vehicle rear side surface of the knee airbag. Therefore, at the time when the airbag door portion opens, the flap may be unfolded before the knee airbag.

In a third aspect of the present disclosure, in the first aspect or the second aspect, an inflator may be disposed at a vehicle front side end portion of an interior of the airbag case, and the knee airbag may be, in the folded state, disposed further toward a vehicle rear side than the inflator.

In the knee airbag device of the third aspect, the inflator is disposed at the vehicle front side where the hinge portion is provided at the airbag case. Due thereto, the knee airbag may be disposed at the vehicle rear side where the planned rupture portion is formed at the airbag case. As a result, the inflation pressure of the knee airbag may be applied effectively to the planned rupture portion.

In a fourth aspect of the present disclosure, in the third aspect, the flap may include a surplus length portion that is folded over in a form of bellows between the inflator and the airbag door portion.

In the knee airbag device of the fourth aspect, owing to the surplus length portion that is bellows-shaped, the length of the flap at the time of unfolding may be made to be long. Further, by providing the surplus length portion between the inflator and the airbag door portion, the inflation pressure of the knee airbag being applied to the planned rupture portion is not impeded by the surplus length portion.

In a fifth aspect of the present disclosure, in any one of the first aspect through the fourth aspect, the planned rupture portion may be formed at a boundary portion, which is between the airbag door portion and a rear side vertical wall that structures a vehicle rear side surface, at the airbag case as seen from a vehicle transverse direction, and the rear side vertical wall may be formed to be thicker than the airbag door portion.

In the knee airbag device of the fifth aspect, at the time when external force is applied to the airbag case, it is easy for stress to concentrate at the boundary portion of the airbag door portion and the thick-walled rear side vertical wall. Due thereto, stress may be concentrated at the planned rupture portion by the inflation pressure of the knee airbag.

BRIEF DESCRIPTION OF THE DRAWINGS

An exemplary embodiment of the present disclosure will be described in detail based on the following figures, wherein.

DETAILED DESCRIPTION

A knee airbag device 10 relating to an exemplary embodiment is described with reference to the drawings. Note that arrow FR and arrow UP that are illustrated appropriately in the respective drawings indicate the vehicle forward direction and the vehicle upward direction, respectively. Hereinafter, when description is given by using merely longitudinal, vertical and left-right directions are used in the following description, they refer to the longitudinal of the vehicle longitudinal direction, the vertical of the vehicle vertical direction, and the left and the right when facing in the vehicle forward direction, unless otherwise specified.

Figure 1:
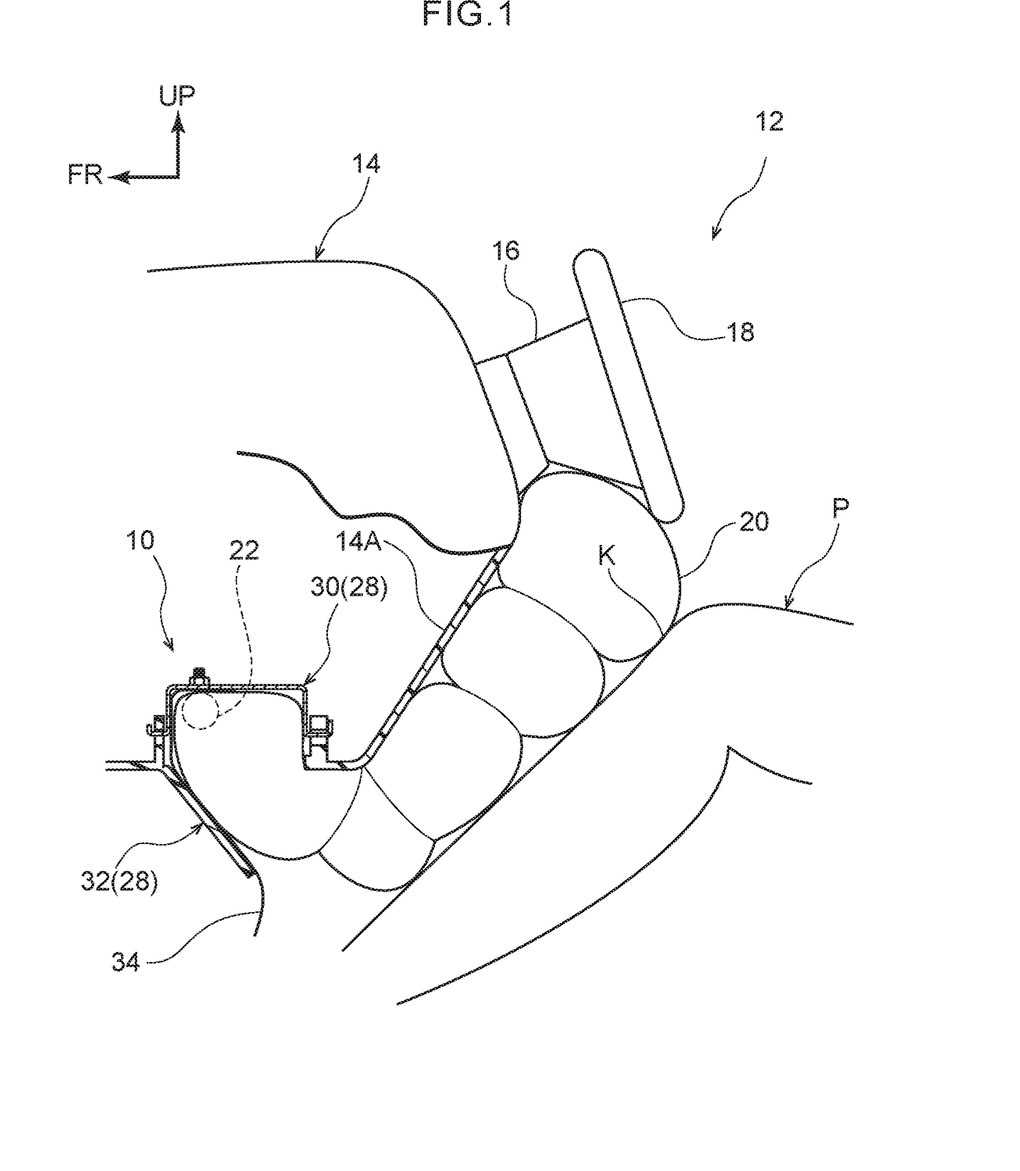
FIG. 1 is a side view that schematically illustrates a driver's seat of a vehicle in which a knee airbag device relating to an embodiment is installed, and is a drawing in which a knee airbag has inflated and expanded.

As illustrated in FIG. 1, the knee airbag device 10 of the present exemplary embodiment is disposed at the lower end portion of an instrument panel 14 that is made of resin and that is provided at the front portion of the vehicle cabin of a vehicle 12. The instrument panel 14 is structured to include an upper panel at the upper side and a lower panel at the lower side. A steering wheel 18 is supported at the upper panel via a steering column 16.

A vertical wall portion 14A, which is inclined toward the vehicle front side while heading toward the vehicle lower side as seen from the vehicle transverse direction, is provided at the lower panel of the instrument panel 14. A knee airbag 20 is structured so as to inflate and expands along the vehicle cabin inner side surface of this vertical wall portion 14A. Knee portions K of a vehicle occupant P are protected by the knee airbag 20 that has inflated and expanded.

Figure 2:
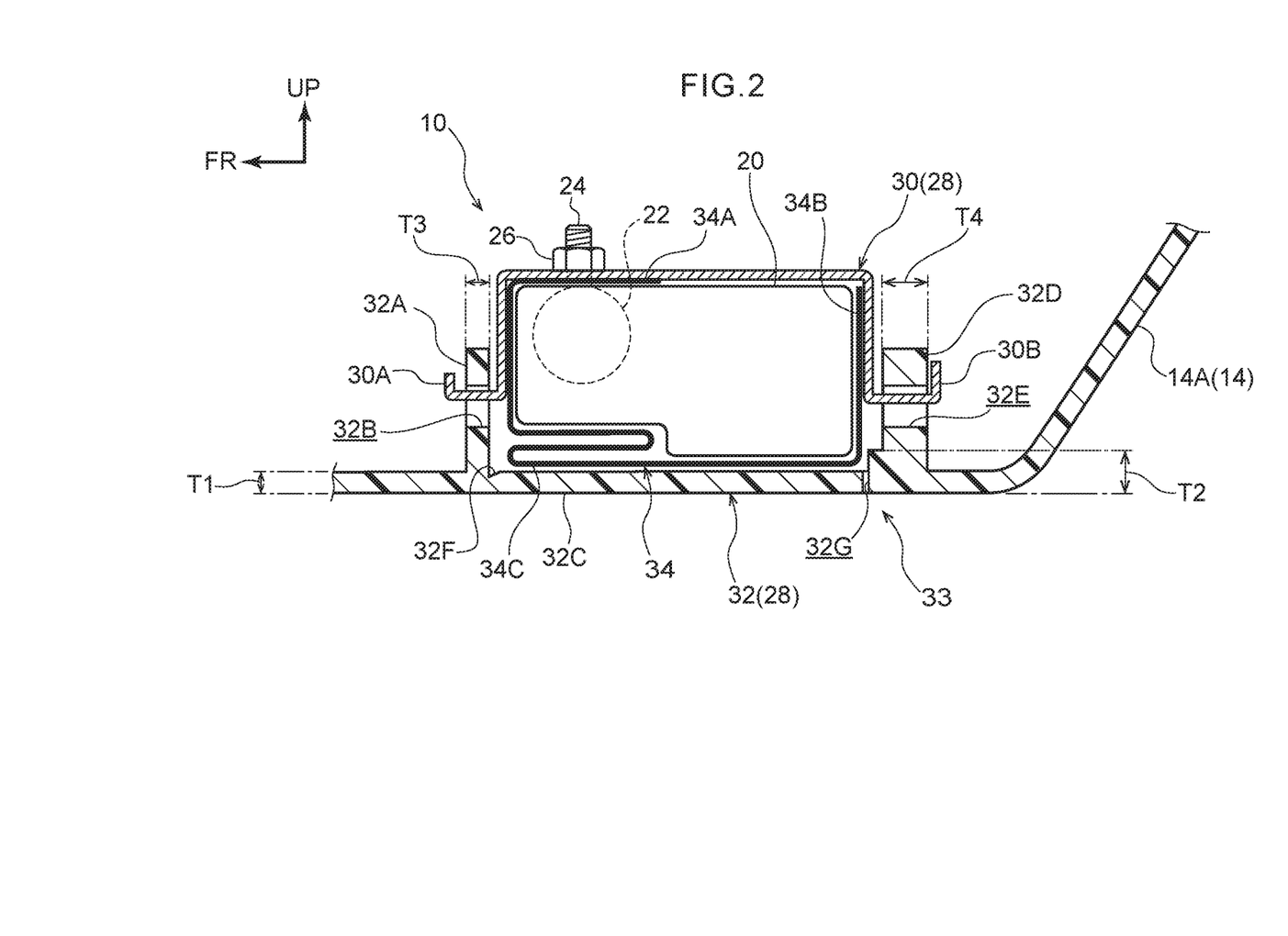
FIG. 2 is an enlarged view of main portions in which main portions of FIG. 1 are enlarged, and is a drawing illustrating a state before the knee airbag is inflated and expanded.

As illustrated in FIG. 2, the knee airbag device 10 is structured so as to mainly include the knee airbag 20, an inflator 22, an airbag case 28 and a flap 34.

The knee airbag 20 is housed in the airbag case 28, which is provided at the lower end portion of the instrument panel 14 and is described later, in a state of being folded-up. The knee airbag 20 is formed in the shape of a bag due to the outer peripheral portions of plural base cloths being sewn together, and inflates due to gas being supplied to the interior thereof.

Figure 3:
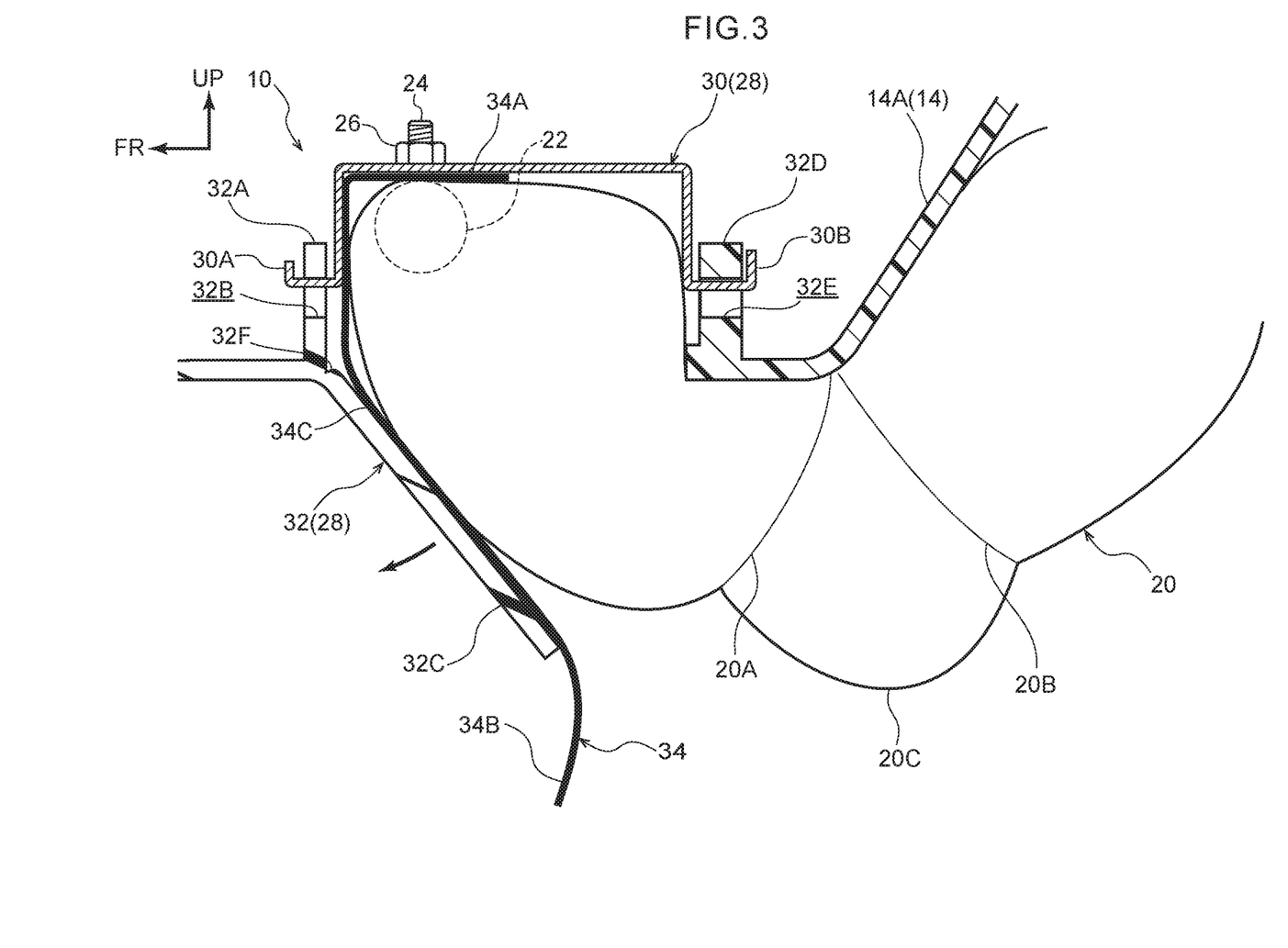
FIG. 3 is an enlarged view of main portions that corresponds to FIG. 2 and illustrates a state in which the knee airbag has inflated and expanded.

As illustrated in FIG. 3, the internal space of the knee airbag 20 is sectioned by plural tethers which are a tether 20A and a tether 20B, and a tuck 20C is provided between the tether 20A and the tether 20B. Due thereto, due to the tuck 20C expanding at the time when the knee airbag 20 inflates and expands, a difference in the peripheral lengths of the knee airbag 20 arises at the vehicle front side and the vehicle rear side thereof, and the bent state thereof is maintained. Namely, the end portion of the knee airbag 20 can be inflated and expanded toward the vehicle rear side and the vehicle upper side along the vertical wall portion 14A.

As illustrated in FIG. 2, the inflator 22 is disposed at the interior of the airbag case 28. The inflator 22 is disposed at the vehicle front side end portion of the interior of the airbag case 28. As an example, the inflator 22 of the present exemplary embodiment is a cylinder-type inflator, and is formed substantially in the shape of a cylindrical tube whose length direction is the vehicle transverse direction. Moreover, an unillustrated igniting portion and gas jetting portion are provided at the inflator 22. Due to the inflator 22 operating, the igniting portion is ignited, and gas is supplied from the gas jetting portion to the knee airbag 20.

Further, the inflator 22 is electrically connected to a control section such as an unillustrated ECU (Electronic Control Unit) or the like. When a collision of the vehicle is sensed, or when a collision of the vehicle is predicted, the inflator 22 is operated by a signal from the control section.

A stud bolt 24 projects-out from the inflator 22 toward the vehicle upper side. The stud bolt 24 is inserted-through the airbag case 28, and extends to the exterior of the airbag case 28. The inflator 22 is fixed to the airbag case 28 due to a nut 26 being screwed-together with the stud bolt 24.

The airbag case 28 is structured to include a first case portion 30 that is made of metal and a second case portion 32 that is made of resin. The first case portion 30 structures the vehicle upper side of the airbag case 28 and is formed substantially in the shape of a box that opens toward the vehicle lower side.

A front side hook portion 30A extends-out toward the vehicle front side from the lower end portion of the vehicle front side surface of the first case portion 30. This front side hook portion 30A catches on the second case portion 32. On the other hand, a rear side hook portion 30B extends-out toward the vehicle rear side from the lower end portion of the vehicle rear side surface of the first case portion 30. This rear side hook portion 30B catches on the second case portion 32.

An unillustrated insert-through hole is formed in the bottom surface of the first case portion 30 (the surface that is at the vehicle upper side). The stud bolt 24 of the inflator 22 is inserted-through this insert-through hole. One end portion 34A of the flap 34 is fixed together with the inflator 22. The flap 34 is described in detail later.

The second case portion 32 structures the vehicle lower side of the airbag case 28. In the present exemplary embodiment, as an example, the second case portion 32 is molded of a resin, integrally with the instrument panel 14. Here, the second case portion 32 is structured to include a front side vertical wall 32A, a rear side vertical wall 32D, and an airbag door portion 32C.

The front side vertical wall 32A structures the vehicle front side end portion of the second case portion 32, and extends in the vehicle vertical direction. A front side mounting hole 32B, which passes-through in the vehicle longitudinal direction, is formed in the front side vertical wall 32A.

The front side hook portion 30A of the first case portion 30 catches on this front side mounting hole 32B.

The rear side vertical wall 32D structures the vehicle rear side end portion of the second case portion 32, and extends in the vehicle vertical direction substantially parallel to the front side vertical wall 32A. A rear side mounting hole 32E, which passes-through in the vehicle longitudinal direction, is formed in the rear side vertical wall 32D. The rear side hook portion 30B of the first case portion 30 catches on this rear side mounting hole 32E.

Here, the rear side vertical wall 32D is formed to have a greater thickness than the front side vertical wall 32A. Concretely, thickness T4 of the rear side vertical wall 32D in the vehicle longitudinal direction is thicker than thickness T3 of the front side vertical wall 32A in the vehicle longitudinal direction. Moreover, the root portion of the rear side vertical wall 32D is thicker than the other portions of the rear side vertical wall 32D.

The portion, which is between the front side vertical wall 32A and the rear side vertical wall 32D, at the second case portion 32 is the airbag door portion 32C. The airbag door portion 32C structures the lower surface of the airbag case 28, and is formed such that the plate thickness direction thereof is the vehicle vertical direction.

Here, a perforation 33 that serve as a planned rupture portion is formed at the vehicle rear side end portion of the airbag door portion 32C. The perforation 33 is formed at the boundary portion between the airbag door portion 32C and the rear side vertical wall 32D, and is structured by plural small holes 32G that are formed at an interval in the vehicle transverse direction. Namely, when the airbag case 28 is viewed from the vehicle lower side, the perforation 33 is formed along the boundary portion between the airbag door portion 32C and the rear side vertical wall 32D.

The perforation 33 is made to be a strength such that it ruptures when the inflation pressure of the knee airbag 20 is applied thereto. Namely, due to gas being supplied from the inflator 22 to the knee airbag 20, the knee airbag 20 inflates, and the perforation 33 is broken. Due thereto, as illustrated in FIG. 3, the airbag door portion 32C is opened toward the vehicle front side.

As illustrated in FIG. 2, a hinge portion 32F, which is thinner-walled than the general portion, is formed at the vehicle front side end portion of the airbag door portion 32C. The hinge portion 32F is formed at the portion of the airbag door portion 32C, which portion is the boundary portion with the front side vertical wall 32A. As illustrated in FIG. 3, when the perforation 33 is ruptured, the airbag door portion 32C is opened toward the vehicle front side around the hinge portion 32F.

Here, the airbag door portion 32C is formed to have the same thickness from the one end to the other end thereof, except for at the hinge portion 32F. The rear side vertical wall 32D is formed to be thicker than the airbag door portion 32C. Concretely, thickness T2 of the root portion of the rear side vertical wall 32D in the vehicle vertical direction is thicker than thickness T1 of the airbag door portion 32C.

The flap 34 is housed in the airbag case 28 together with the knee airbag 20. The flap 34 is a cloth-like member that is structured from the same base cloth as the knee airbag 20. The one end portion 34A of the flap 34 is fixed to the airbag case 28.

The flap 34 is rolled around the periphery of the knee airbag 20. Namely, the flap 34 is disposed, from the fixed one end portion 34A thereof, at the vehicle front side of the knee airbag 20, and further, passes between the lower surface of the knee airbag 20 and the airbag door portion 32C. Another end portion 34B of the flap 34 extends along the vehicle rear side surface of the knee airbag 20 toward the vehicle upper side, and is a free end. In this way, the flap 34 is formed to be longer than the airbag door portion 32C, and is housed so as to cover the vehicle lower side surface and the vehicle rear side surface of the folded-up knee airbag 20.

Further, the flap 34 has a surplus length portion 34C. The surplus length portion 34C is provided in the space between the knee airbag 20 and the airbag door portion 32C, at the vehicle lower side of the inflator 22, and is folded-over in the shape of bellows. Therefore, the greater part of the knee airbag 20 is disposed further toward the vehicle rear side than the inflator 22.

As illustrated in FIG. 3, at the time when the airbag door portion 32C opens and the knee airbag 20 is inflated and expanded, the another end portion 34B of the flap 34 is unfolded, and the surplus length portion 34C extends. Therefore, the airbag door portion 32C is in a state of being covered by the flap 34 from the vehicle rear side.

(Operation)

Operation of the present exemplary embodiment is described next.

In the knee airbag device 10 of the present exemplary embodiment, the knee airbag 20 is housed in a folded state within the airbag case 28 that is at the lower end portion of the instrument panel 14. When a collision of the vehicle is sensed, or when a collision of the vehicle is predicted, the inflator 22 operates, and gas is supplied to the knee airbag 20. Due thereto, the knee airbag 20 is inflated and expanded toward the vehicle rear side and the vehicle upper side along the vertical wall portion 14A of the instrument panel 14. Due thereto, the knee portions K of the vehicle occupant can be protected by the knee airbag that has inflated and expanded (see FIG. 1).

Further, in the present exemplary embodiment, as illustrated in FIG. 2, the lower surface of the airbag case 28 is structured by the airbag door portion 32C. Due to the perforation 33 rupturing, the airbag door portion 32C is opened toward the vehicle front side around the hinge portion 32F as illustrated in FIG. 3. Due thereto, the airbag door portion 32C flying-off toward the vehicle occupant can be suppressed, as compared with a structure in which the airbag door portion 32C is opened toward the vehicle rear side. This operation is explained with reference to the comparative example of FIG. 4.

Figure 4:
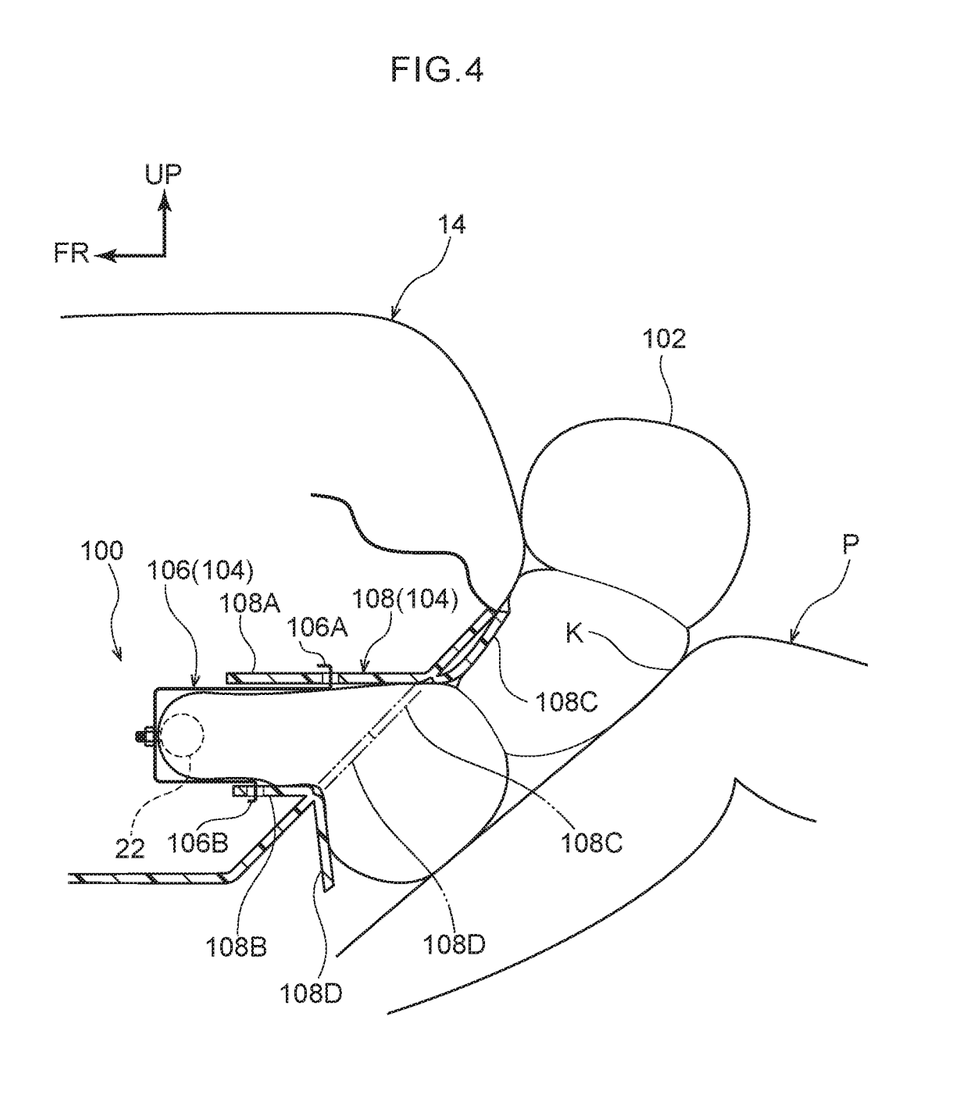
FIG. 4 is a side view that corresponds to FIG. 1 and illustrates a knee airbag device of a comparative example.

As illustrated in FIG. 4, a knee airbag device 100 of a comparative example is structured to include a knee airbag 102 and the inflator 22. The knee airbag 102 is housed in an airbag case 104 in a folded state, and is inflated and expanded toward the vehicle rear side due to gas being supplied thereto from the inflator 22.

The airbag case 104 is structured to include a first case portion 106 that is made of metal and a second case portion 108 that is made of resin. The first case portion 106 structures the vehicle front side of the airbag case 104, and is formed substantially in the shape of a box that opens toward the vehicle rear side.

An upper side hook portion 106A extends-out toward the vehicle upper side from the rear end portion of the vehicle upper side surface of the first case portion 106. This upper side hook portion 106A catches on the second case portion 108. On the other hand, a lower side hook portion 106B extends-out toward the vehicle lower side from the rear end portion of the vehicle lower side surface of the first case portion 106. This lower side hook portion 106B catches on the second case portion 108.

Moreover, the inflator 22 is fixed to the bottom surface of the first case portion 106 (the surface at the vehicle front side).

The second case portion 108 structures the vehicle rear side of the airbag case 104, and is molded of a resin integrally with the instrument panel 14. The second case portion 108 is structured to include an upper side lateral wall 108A, a lower side lateral wall 108B, an upper side airbag door portion 108C, and a lower side airbag door portion 108D.

The upper side lateral wall 108A extends in the vehicle longitudinal direction, and the upper side hook portion 106A of the first case portion 106 catches thereon. On the other hand, the lower side lateral wall 108B extends substantially parallel to the upper side lateral wall 108A at the lower side thereof. The lower side hook portion 106B of the first case portion 106 catches on the lower side lateral wall 108B.

In the state before rupturing, the upper side airbag door portion 108C extends from the rear end portion of the upper side lateral wall 108A obliquely toward the vehicle lower side and the vehicle front side (refer to two-dot chain line 108C). Further, in the state before rupturing, the lower side airbag door portion 108D extends from the rear end portion of the lower side lateral wall 108B obliquely toward the vehicle upper side and the vehicle rear side (refer to two-dot chain line 108D). The upper side airbag door portion 108C and the lower side airbag door portion 108D are formed integrally. An unillustrated, thin-walled tear portion is formed at the boundary portion between the upper side airbag door portion 108C and the lower side airbag door portion 108D.

Therefore, when inflation pressure acts on the second case portion 108 from the knee airbag 102, the tear portion ruptures, and the upper side airbag door portion 108C and the lower side airbag door portion 108D are respectively opened toward the vehicle rear side.

Here, it is thought that, in a case in which the airbag case 108 is formed of a resin material or the like that breaks easily, portions of the upper side airbag door portion 108C and the lower side airbag door portion 108D will fly-off toward the vehicle rear side (the vehicle occupant P side).

Further, in the knee airbag device 100 of the comparative example, a flap is not housed in the airbag case 104. Therefore, in the state in which the upper side airbag door portion 108C and the lower side airbag door portion 108D have been opened, for example, the distal end portion of the lower side airbag door portion 108D becomes exposed, and therefore, there is the possibility that the distal end portion will contact the legs of the vehicle occupant P who inertially moves toward the vehicle front side.

In contrast, in the knee airbag device 10 relating to the present exemplary embodiment, as illustrated in FIG. 3, at the time when the knee airbag 20 inflates and expands, the flap 34 that is housed in the airbag case 28 is unfolded. Due thereto, the airbag door portion 32C is covered from the vehicle rear side by the flap 34, and, even in a case in which a portion of the airbag case 28, such as the airbag door portion 32C or the like, comes apart from the main body, that portion flying-off toward the vehicle occupant can be suppressed. As a result, there is no need to use a resin material such as TPO or the like. A portion of the airbag case 28 flying-off toward the vehicle occupant at the time of inflation and expansion can be suppressed while the manufacturing cost is kept low.

Further, in the present exemplary embodiment, the flap 34 is formed to be longer than the airbag door portion 32C. Due thereto, the distal end of the airbag door portion 32C can be covered reliably, and the distal end of the airbag door portion 32C contacting the vehicle occupant can be suppressed, and the knee airbag 20 breaking can be suppressed.

In particular, in the present exemplary embodiment, as illustrated in FIG. 2, the flap 34 is housed so as to cover the vehicle lower side surface and the vehicle rear side surface of the knee airbag 20. Therefore, at the time when the airbag door portion 32C opens, the flap 34 can be unfolded before the knee airbag 20. Namely, a portion of the airbag case 28 flying-off toward the vehicle occupant can be suppressed effectively.

Moreover, in the present exemplary embodiment, the inflator 22 is disposed at the vehicle front side of the airbag case 28. Due thereto, the knee airbag 20 can be disposed in a vicinity of the perforation 33 that is the planned rupture portion at the airbag case 28. As a result, the inflation pressure of the knee airbag 20 can be applied effectively to the perforation 33, and the airbag door portion 32C can be opened smoothly.

Still further, in the present exemplary embodiment, the flap 34 can be made to be long owing to the surplus length portion 34C that is bellows-shaped. Further, by providing the surplus length portion 34C between the inflator 22 and the airbag door portion 32C, the inflation pressure of the knee airbag 20 being applied to the perforation 33 is not impeded by the surplus length portion 34C. As a result, the distal end of the airbag door portion 32C can be reliably covered by the flap 34 while the airbag door portion 32C is opened smoothly.

Moreover, in the present exemplary embodiment, the perforation 33 is provided at the boundary portion which is between the airbag door portion 32C and the thick-walled rear side vertical wall 32D and at which it is easy for stress to concentrate at the time when external force is applied to the airbag case 28. Due thereto, stress can be concentrated at the perforation 33 by the inflation pressure of the knee airbag 20, and the airbag door portion 32C can be ruptured reliably.

Although an exemplary embodiment has been described above, the present disclosure can of course, can be implemented in various forms within a scope that does not depart from the gist thereof. For example, in the above-described embodiment, the perforation 33 is formed as the planned rupture portion, but the present disclosure is not limited to this, and another planned rupture portion may be formed. A tear portion may be formed by forming a portion of the airbag door portion 32C to be thin.

Further, in the present exemplary embodiment, as illustrated in FIG. 3, the flap 34 is formed to be longer than the airbag door portion 32C, but the present disclosure is not limited to this. In a structure in which the airbag door portion 32C opens toward the vehicle rear side as in the present exemplary embodiment, the possibility that the distal end of the airbag door portion 32C will contact the legs of the vehicle occupant P is low. Therefore, the length of the flap 34 may be formed to be shorter than the airbag door portion 32C, for the purpose of merely preventing a portion of the airbag door portion 32C from coming apart and flying-off toward the vehicle occupant P.

Moreover, in the above-described embodiment, as illustrated in FIG. 2, the surplus length portion 34C is provided by folding the flap 34 over in the form of bellows at the lower side of the inflator 22. However, the present disclosure is not limited to this. For example, the surplus length portion may be formed by rolling-in the flap 34 along the outer surface of the knee airbag 20 to the position of the another end portion 34B, and folding the flap 34 over at the position of this another end portion 34B.

What is claimed is:

1. A knee airbag device comprising:
a knee airbag that is housed in a folded state at a lower end portion of an instrument panel, and that, due to gas being supplied thereto, is inflated and expanded along the instrument panel toward a vehicle rear side and a vehicle upper side;
an airbag case that houses the knee airbag;
an airbag door portion that structures a lower surface of the airbag case, and that, due to a planned rupture portion that is formed at a vehicle rear side end portion of the airbag door portion rupturing due to inflation pressure of the knee airbag, is opened toward a vehicle front side around a hinge portion that is provided at a vehicle front side end portion of the airbag door portion;
an inflator disposed at a vehicle front side end portion of an interior of the airbag case; and
a flap that is housed within the airbag case, one end portion of the flap being fixed to the airbag case, another end portion of the flap being a free end, and that, at a time of inflation and expansion of the knee airbag, unfolds, and covers the airbag door portion from a vehicle rear side, the flap includes a surplus length portion folded over in a form of bellows between the inflator and the airbag door portion, the surplus length portion folded over in the form of bellows positioned between the knee airbag and the airbag door portion within an indentation defined by the knee airbag,
wherein, in the folded state, a greater part of the knee airbag is disposed further toward the vehicle rear side than the vehicle front side,
wherein, in the folded state, the greater part of the knee airbag is disposed further toward the vehicle rear side than the inflator.

2. The knee airbag device of claim 1, wherein the flap is longer than the airbag door portion, and is housed so as to cover a vehicle lower side surface and a vehicle rear side surface of the knee airbag, when the knee airbag is in the folded state.

3. The knee airbag device of claim 1, wherein:
the planned rupture portion is formed at a boundary portion, which is between the airbag door portion and a rear side vertical wall that structures a vehicle rear side surface, at the airbag case as seen from a vehicle transverse direction, and
the rear side vertical wall is formed to be thicker than the airbag door portion.

4. The knee airbag device of claim 3, wherein the rear side vertical wall is formed to have a greater thickness than a front side vertical wall that structures a vehicle front side surface at the airbag case.

5. The knee airbag device of claim 3, wherein a base portion of the rear side vertical wall is thicker than other portions of the rear side vertical wall.

6. The knee airbag device of claim 1, wherein:
the airbag case is structured by a first case portion that is made of metal and a second case portion that is made of resin,
the first case portion is formed in a shape of a box that opens toward a vehicle lower side, and structures a vehicle upper side of the airbag case, and
the second case portion is molded of a resin integrally with the instrument panel, and structures a vehicle lower side of the airbag case.

7. The knee airbag device of claim 1, wherein the surplus length portion is disposed at a vehicle lower side of the inflator.

* * * * *